(12) United States Patent
Biermann et al.

(10) Patent No.: US 6,509,744 B1
(45) Date of Patent: Jan. 21, 2003

(54) METHOD FOR MEASURING THE DISTANCE BETWEEN A SENSOR ELECTRODE AND A WORKPIECE

(75) Inventors: Stephan Biermann, Gernsbach; Georg Spörl, Rheinstetten, both of (DE)

(73) Assignee: precitec GmbH, Rotenfels (DE)

( * ) Notice: Subject to any disclaimer, the term of this patent is extended or adjusted under 35 U.S.C. 154(b) by 0 days.

(21) Appl. No.: 09/504,714

(22) Filed: Feb. 16, 2000

(30) Foreign Application Priority Data

Feb. 16, 1999 (DE) .......................... 199 06 442

(51) Int. Cl.[7] ........................ G01R 27/32; G01R 27/26
(52) U.S. Cl. ................... 324/662; 324/635; 324/690
(58) Field of Search ................... 324/662, 671, 324/699, 716, 661

(56) References Cited

U.S. PATENT DOCUMENTS 6,054,866 A * 4/2000 Mansfield ............... 324/662

FOREIGN PATENT DOCUMENTS

| DE | 4020196 A1 | 1/1992 |
| DE | 4311064 A1 | 10/1994 |
| DE | 4340395 C1 | 12/1994 |

* cited by examiner

*Primary Examiner*—N. Le
*Assistant Examiner*—James Kerveros
(74) *Attorney, Agent, or Firm*—Birch, Stewart, Kolasch & Birch, LLP

(57) ABSTRACT

The invention relates to a method and a device for measuring the distance between a sensor electrode and a workpiece. The sensor electrode forms, with the workpiece, a measuring capacitor through which an alternating current flows. A voltage present at the sensor electrode is tapped as a measuring voltage. In order to be able to remove the disturbing influence on the impedance of the measuring capacitor of a plasma forming between the sensor electrode and workpiece, the real part and the imaginary part from the measuring voltage are analyzed and used to determine the distance between the sensor electrode and the workpiece.

10 Claims, 2 Drawing Sheets

METHOD FOR MEASURING THE DISTANCE BETWEEN A SENSOR ELECTRODE AND A WORKPIECE

BACKGROUND OF THE INVENTION

1. Field of the Invention

The present invention relates to a method for measuring the distance between a sensor electrode and a workpiece.

2. Description of the Relevant Art

It is already known in the case of machine tools, in particular in the case of laser machine tools, for the distance between a workpiece and a tool head for machining the workpiece to be measured in a capacitive way. For this purpose, it is customary for the tool head to be fitted with a sensor electrode which forms together with the workpiece a measuring capacitor whose capacitance depends on the distance between the sensor electrode and workpiece. The sensor electrode then supplies a sensor signal from which it is possible, for the purpose of controlling the machine tool, to derive the capacitance of the measuring capacitor, and thus the distance to be measured between the sensor electrode and workpiece.

By monitoring the sensor signal, it is therefore possible for the tool head to be positioned accurately relative to the workpiece in order to be able to machine the workpiece in a suitable way. The positioning is performed in this case via a control device which receives the measured distance, determined from the sensor signal, as actual value and compares it with a prescribed desired value in order to control the tool head as a function of the result of comparison.

However, in the case of machine tools such as flame cutting machines and, in particular, laser machine tools, there is the problem that as a workpiece is being processed a plasma which acts essentially like an ohmic resistance connected in parallel with the measuring capacitor is formed between the sensor electrode and the workpiece. Such a plasma, which is produced, for example, below a laser cutting nozzle when a certain cutting speed is reached during welding or cutting work has a falsifying effect on the distance measurement.

In order to exclude the influence of a plasma between the sensor electrode and workpiece on the distance measurement, use is made in conventional distance-measuring methods of the LC-oscillator principle, in which the measuring capacitor forms, together with an inductive resistor connected in parallel, a resonant circuit whose frequency, which depends on the measuring capacitance, is monitored in order to determine the distance to be measured. A plasma acting essentially only as an ohmic resistance in this case influences only the amplitude of the oscillation of the resonant circuit, but not the frequency thereof.

A problem in this method is that stray capacitances must be kept very low in order to achieve the measuring accuracy required for reliable control of the machine tool. Complicated insulation measures are required to reduce the stray capacitances.

DE 40 20 196 A1 discloses a further capacitive distance-measuring method in which a measuring capacitor is fed with a constant alternating current so that the measuring voltage tapped at the sensor electrode of the measuring capacitor depends exclusively on the impedance of the measuring capacitor. As long as no plasma exists between the sensor electrode and the workpiece during machining of the workpiece, the impedance is formed virtually exclusively by the capacitive resistance of the measuring capacitor, with the result that the measuring voltage is proportional to the distance between the sensor electrode and workpiece. However, if a plasma occurs, there is an ohmic resistance parallel to the capacitance of the measuring capacitor which influences the impedance of the measuring capacitor. In this case, the plasma can lead to the reduction in the impedance of the measuring capacitor such that the sensor signal virtually collapses, and the control device erroneously returns much too small a distance.

It is possible in the case of this known method for short-term disturbances owing to a plasma to be masked out electronically, or for the influence of a plasma cloud to be essentially excluded by geometrical measures when designing the sensor electrode. However, it has emerged that during working the sensor signal is in some cases permanently disturbed by a continuously present plasma, and that the geometrical measures in the design of the sensor electrode worsen the spatial resolution of the measurement.

SUMMARY OF THE INVENTION

Starting therefrom, it is the object of the invention to provide a method for measuring the distance between a sensor electrode and a workpiece which eliminates the influence of a plasma between the sensor electrode and workpiece on the distance measurement.

Thus, according to the invention in a method for measuring the distance between a sensor electrode and a workpiece in which the sensor electrode forms with the workpiece a measuring capacitor through which an alternating current flows, a voltage present at the sensor electrode is tapped as measuring voltage. The real part and imaginary part of this measuring voltage are determined, in order to determine therefrom the distance to be measured.

In this way, the capacitance or the reactance, dependent on the distance between the workpiece and sensor electrode, of the measuring capacitor, and thus the distance itself, can be calculated independently of the plasma impedance even in the case of a varying measuring current. It is thereby possible not only to eliminate the influence of a plasma between the sensor electrode and workpiece on the distance measurement, but it is also no longer necessary to provide an additional current source for generating an alternating current with constant amplitude. The method according to the invention thus does not require electronic and/or geometrical measures for masking out or suppressing disturbing influences of the plasma, nor additional current sources.

The invention thus adopts a completely new approach by accepting for the distance measurement, in addition to changes in the measuring-current amplitude, the production of a plasma and the influence thereof on the impedance of the measuring capacitor and, instead of this, selecting the measuring frequency used such that at this frequency the plasma acts virtually as a pure ohmic resistance. This renders it possible to use the real and imaginary parts of the measuring voltage to determine the measuring capacitance, in order then to use appropriate subsequent calculations or calibrations to obtain the distance or a signal indicating the distance.

Since the properties of a plasma between the measuring electrode and the workpiece depend on the current parameters of the respective machining, it is provided in the case of an advantageous development of the invention that a signal corresponding to the electric properties, in particular the resistance of the plasma between the sensor electrode and workpiece is determined from the real and imaginary parts of the measuring voltage. This signal can then be used to monitor and control the respective machining operation, and thus for quality assurance.

In an expedient development of the invention, it is provided that in order to determine its real part and imaginary part, the measuring voltage is combined with a first and a second AC voltage which are mutually phase-shifted by a quarter period.

It is possible in this case that in order to determine its real part and imaginary part, the measuring voltage is multiplied by a first alternative voltage and a second AC voltage phase-shifted with respect thereto by a quarter period, preferably by a cosinusoidal or sinusoidal AC voltage, respectively. Another advantageous possibility consists in that in order to determine its real part and imaginary part, the measuring voltage is subjected to a first and a second synchronous rectification, respectively.

The method can be carried out with particular ease if for the purpose of the first synchronous rectification use is also made of the same AC voltage which serves to generate the measuring voltage, while for the purpose of the second synchronous rectification use is made of the same AC voltage phase-shifted by a quarter period with respect thereto.

For further calculations, the components of the measuring voltage obtained by multiplication or synchronous rectification are then expediently freed from AC voltage components by low-pass filtering, in order to obtain voltage signals corresponding to the real and imaginary parts of the measuring voltage.

A particularly expedient development of the invention is distinguished in that using the real and imaginary parts of the AC voltage used to generate the measuring voltage the measuring capacitance or the reactance of the measuring capacitor is determined from the voltage signals representing the real and imaginary parts by calculating the voltage divider formed by the reference resistor and measuring capacitor.

The invention not only has the advantage of a distance measurement which can be continued with high accuracy for controlling a tool head of a machine tool even given the occurrence of plasma formation, but in addition it also permits monitoring of the machining operation if using the real and imaginary parts of the AC voltage used to generate the measuring voltage the plasma impedance of the measuring capacitor (16) is determined from the voltage signals representing the real and imaginary parts by calculating the voltage divider formed by the reference resistor and measuring capacitor. As a result, it is possible, on the one hand, to detect the existence or non-existence of a plasma and the intensity of a plasma located between the sensor electrode and workpiece, and to use it to monitor the machining operation.

For example, the acceptable execution of laser cutting can be monitored by observing the plasma. During normal, acceptable laser cutting, a plasma forming in the process is essentially blown away by the ensuing cut, with the result that only a thin plasma with a high ohmic resistance and therefore a weak influence on the distance measurement is present between the sensor electrode and the workpiece. If the acceptable cutting breaks down, however, for whatever reason, the plasma density rises between the sensor electrode and workpiece, with the result that at the same time the resistance of the plasma drops sharply, and this can be established straight away if the plasma impedance is continuously determined. Such a rise in the plasma conductivity therefore indicates a fault in the laser cutting. Monitoring the plasma impedance therefore permits faults to be detected early, and suitable countermeasures to be taken.

In order to increase the accuracy of the distance measurement and, if appropriate, to enhance the plasma monitoring, it is provided according to the invention that the measuring line to the sensor electrode is actively screened, in which case the measuring voltage tapped via the measuring line is expediently applied to the screen of the measuring line via an impedance transformer. It is possible in this way for stray capacitances, which occur in parallel with the measuring capacitance, to be substantially reduced, thereby not only achieving a simpler technical design, but also simplifying the voltage divider and, consequently, its calculation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention is explained in more detail below by way of example with the aid of an exemplary embodiment represented in the drawing, in which.

DETAILED DESCRIPTION OF THE DRAWINGS

Figure 1:
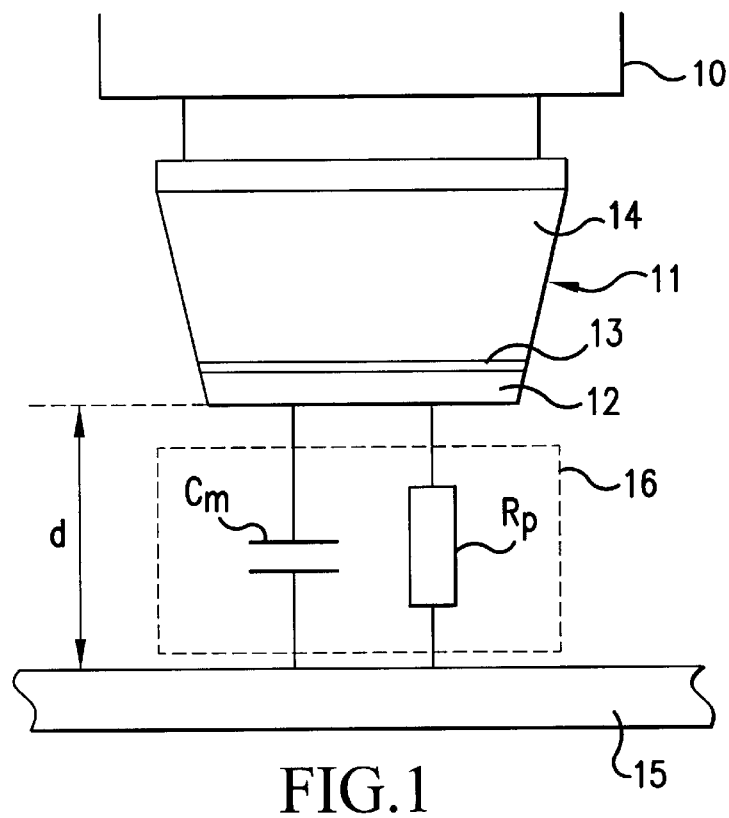
FIG. 1 shows an equivalent circuit of a measuring capacitor provided between a tool head and a workpiece.

Mutually corresponding circuit elements are provided in the various figures of the drawing with the same reference symbols.

FIG. 1 shows a tool head 10, for example a laser tool head, on which a sensor head 11 is fitted. The sensor head 11 bears a sensor electrode 12 which is insulated from a support member 14 by an insulator 13 (indicated purely diagrammatically). The sensor electrode 12 can also be held in another way in a fixed geometrical relationship to the tool head. For example, it is possible to use a bow or the like to keep the sensor electrode next to or below the tool head. The sensor electrode 12 forms together with an oppositely situated workpiece 15 a measuring capacitor 16 whose measuring capacitance $C_m$ depends on the distance d between the sensor electrode 12 and workpiece 15. Represented in parallel with the measuring capacitance $C_m$ is a resistance $R_p$ which describes the ohmic resistance of a plasma located between the sensor electrode 12 and workpiece 15.

Figure 2:
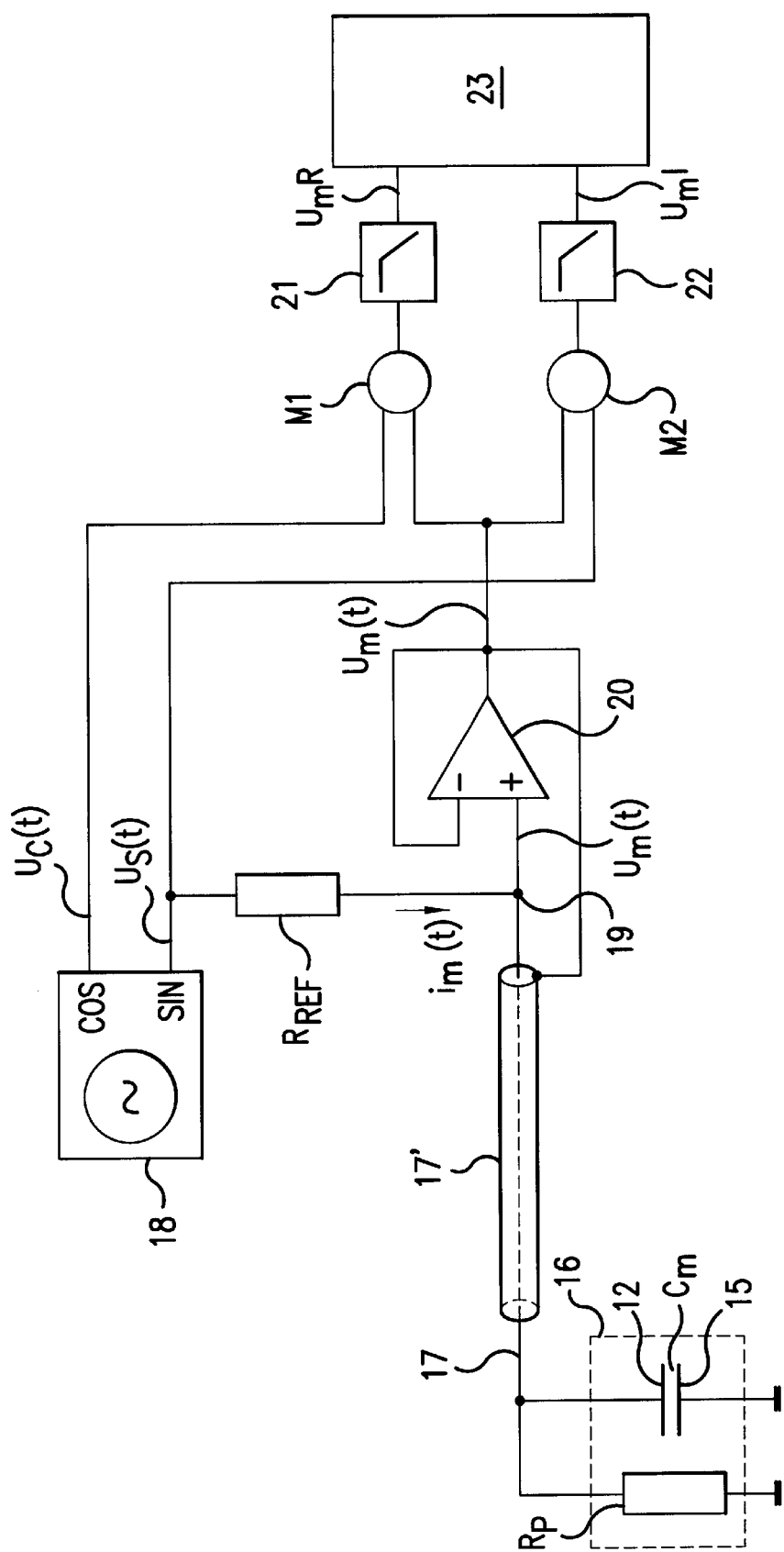
FIG. 2 shows a block diagram of a circuit for measuring the distance between a sensor electrode and a workpiece.

As FIG. 2 shows, the sensor electrode 12 is connected to a first output sin of an AC voltage generator 18 via a screened line 17 and a resistor $R_{ref}$. A connecting point 19 between the reference resistor $R_{ref}$ and the screened line 17 is connected to the non-inverting input of an operational amplifier 20, which serves as impedance transformer and whose output is applied both to its inverting input and to the screen 17' of the screened line 17.

Furthermore, the output of the operational amplifier 20 is connected to first inputs of circuit elements M1, M2 which preferably operate as synchronous rectifiers, as is still to be described. The outputs of these circuit elements M1 and M2 are respectively connected to an arithmetic-logic unit 23 via a low pass filter 21 and 22, respectively.

A second output cos of the AC voltage generator 18 supplies a cosinusoidal AC voltage $U_c(t)$ at a second input of the circuit element M1, while the first output sin of the AC voltage generator 18 supplies a sinusoidal AC voltage $U_s(t)$ to a second input of the second circuit element M2. It is also possible for other AC voltages of the same frequency which are mutually phase-shifted by 90°, for example square-wave voltages, to be applied to the second inputs of the circuit elements.

The sinusoidal AC voltage $U_s(t)$ at the first output sin of the AC voltage generator 18, which is present at the reference resistor $R_{ref}$, produces a current which flows as measuring current $i_m(t)$ via the screened line 17 and, furthermore, via the measuring capacitor 16. The current from the connecting point 19 into the non-inverting input of the operational amplifier 20 is thereby virtually zero, since the operational amplifier 20 is connected as an impedance transformer. The measuring current $i_m(t)$ therefore produces at the connecting point 19 a measuring voltage $U_m(t)$ which is also present at the output of the operational amplifier 20.

Since the connection of the output of the operational amplifier 20 to the screen 17' of the screened line 17 places both the line 17 itself and its screen 17' at the same potential $U_m(t)$, and since the screen 17' is connected (in a way not represented in more detail) to the support member 14 of the sensor head 11, the action of the capacitances between the line 17 and the screen 17' and between the sensor electrode 12 and support member 14 is removed. Because of this active screening of the measuring line, the capacitance between the sensor electrode 12 and line 17, on the one hand, and the support member 14 and screen 17', on the other hand, can therefore amount to a multiple of the measuring capacitance $C_m$ between the sensor electrode 16 and workpiece 15 without the accurate detection of the measuring capacitance $C_m$ thereby being impaired. Consequently, the insulator 13 between the sensor electrode 12 and support member 14 can also be of very thin design irrespective of a capacitive screen.

If no plasma is present between the tool head 10 and workpiece 15, that is to say if the plasma impedance $R_p \approx \infty$, the measuring voltage $U_m(t)$ is determined solely by the measuring capacitance $C_m$ of the measuring capacitor 16.

However, if a plasma is present, the impedance of the plasma, which can be interpreted as a pure resistance given a suitably selected generator frequency, likewise influences the measuring voltage $U_m(t)$.

Assuming that no current flows from the connecting point 19 between the reference resistor $R_{ref}$ and measuring capacitor 16 into the operational amplifier 20 connected as an impedance transformer, the voltage divider composed of the reference resistor $R_{ref}$ and measuring capacitor 16 can be described in the usual way using the formula $U_s/(R_{ref}+R_x) = U_m/R_x$ (where $R_x = R_p - 1/j\omega C_m$; j as the imaginary unit and $\omega = 2\pi f$ (f=generator frequency)).

The following relationship for the impedance $R_x$ of the measuring capacitor 16 is yielded from this by computational transformation: $R_x = R_{ref}/(U_s/U_m - 1)$. The following relationships for the capacitive reactance $X_{Cm} = 1/j\omega C_m$ and for the plasma impedance $R_p$ are yielded from this equation by forming the real and imaginary parts:

$$X_{Cm} = R_{ref} \cdot \frac{U_{mR}^2 + U_{mI}^2}{U_{sR} \cdot U_{mI} - U_{sI} \cdot U_{mR}}$$

$$R_p = R_{ref} \cdot \frac{U_{mR}^2 + U_{mI}^2}{U_{sR} U_{mR} + U_{sI} U_{mI} - (U_{mR}^2 + U_{mI}^2)}$$

In order in accordance with these relationships to be able in each case to derive the magnitude of the measuring capacitance $C_m$ and the magnitude of the plasma impedance $R_p$ or, at least, measuring signals proportional to these variables from the measuring voltage $U_m(t)$, the measuring voltage $U_m(t)$ is mixed or combined in the first circuit element M1 of the evaluation circuit with a cosinusoidal AC voltage $U_c(t)$, and mixed or combined in the second circuit element M2 with a sinusoidal AC voltage $U_s(t)$, for example by multiplication or in accordance with a synchronous rectification. The output signals of the circuit elements M1 and M2 are then in each case freed from the AC voltage components in a low pass filter 21 and 22, respectively, and now constitute the real and imaginary parts of the measuring voltage $U_m(t)$. In this case, the multiplication or synchronous rectification of the measuring voltage $U_m(t)$ in the first circuit element M1 with the use of a cosinusoidal AC voltage $U_c(t)$ yields a measure of the real part $U_{mR}$ of the measuring voltage $U_m(t)$, while the synchronous rectification or multiplication using the sinusoidal AC voltage $U_s(t)$, also used to generate the measuring voltage $U_m(t)$, in the second circuit element M2 leads to the imaginary part $U_{mI}$ of the measuring voltage $U_m(t)$.

Since the amplitude and phase of the AC voltages generated by the alternating current generator 18, in particular of the sinusoidal AC voltage $U_s(t)$, are known, the voltage divider formed from the reference resistor $R_{ref}$ and measuring capacitor 16 can be calculated using the above equations, and it is possible to determine the capacitance $C_m$, proportional to the distance between the electrode and workpiece, of the measuring capacitor 16 and, if desired, the plasma impedance $R_p$. It is possible in this way to detect the distance d between the sensor electrode 12 and workpiece 15 independently of the existence of a plasma via the measuring capacitance $C_m$.

In order to determine the distance d between the workpiece 15 and sensor electrode 12 and/or the measuring capacitance $C_m$ dependent thereon, of the measuring capacitor 16, or to calculate its capacitive reactance $X_{Cm}$, the arithmetic-logic unit 23 can comprise a microprocessor which is fed in digital form the voltage signals $U_{mR}$, $U_{mI}$ representing the real and imaginary parts of the measuring voltage $U_m$ via analogue-to-digital converters (not represented). Depending on the requirements placed on the downstream control device, the microprocessor then supplies either directly the distance or the capacitance and/or the reactance of the measuring capacitor, in which case the distance can then be obtained from the latter values via a corresponding calibration curve or calibration table.

Figure 3:
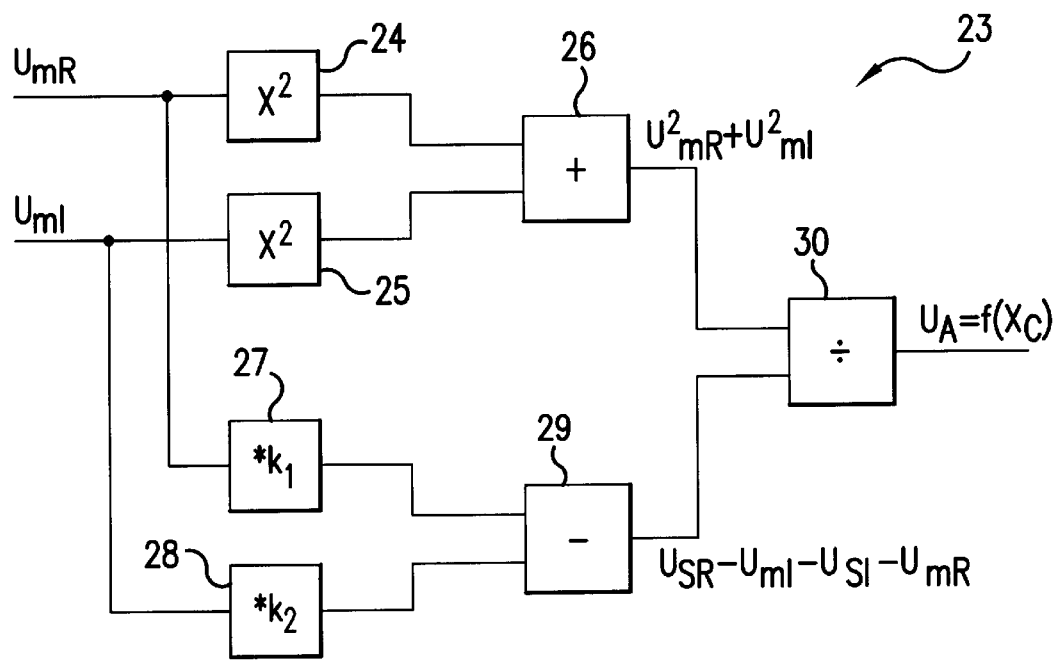
FIG. 3 shows a block diagram of an arithmetic-logic unit provided in the circuit according to FIG. 2.

However, it is also possible, for example, to form in an analogous way from the voltage signals $U_{mR}$, $U_{mI}$ representing the real and imaginary parts of the measuring voltage $U_m$ an output voltage $U_A$ which represents a function of the reactance $X_{Cm}$ of the measuring capacitor 16, and thus a function of the distance d between the workpiece 15 and sensor electrode 12. As is shown in FIG. 3, for this purpose the arithmetic-logic unit 23 comprises two multiplier circuits 24, 25 in which the voltage signals $U_{mR}$, $U_{mI}$ are respectively multiplied by themselves, with the result that the output signals of the multiplier circuits 24, 25 represent the squares of the input voltages. The output signals of the multiplier circuits 24, 25 are then added together in an adder 26, in order in this way to determine the numerator of the fraction specified in the equation for the reactance $X_{Cm}$.

Moreover, the voltage signals $U_{mR}$ and $U_{mI}$ are fed to further multiplier circuits 27, 28, in which the voltage signals are multiplied by coefficients k1 and k2, respectively, which correspond to the imaginary part and the real part, respectively, of the sinusoidal AC voltage $U_s$ generated by the AC voltage generator 18. The output signals of these second multipliers 27, 28 are subtracted from one another in a subtractor 29, in order to obtain a signal corresponding to the denominator of the fraction specified in the equation for reactance. Subsequently, the output signals of the adder 26 and subtractor 29 are combined with one another in a divider 30, in order to form the output voltage $U_A$ dependent on the reactance of the measuring capacitor 16 or on its measuring capacitance.

A signal proportional to the plasma impedance $R_p$ can be formed correspondingly in a digital or analogue fashion when it is desired to monitor the plasma impedance in order to control the quality of cut.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for measuring the distance between a sensor electrode and a workpiece, wherein the sensor electrode and the workpiece form a measuring capacitor therebetween, comprising the steps of:

producing an alternating current which flows through the measuring capacitor;

measuring a voltage present at the sensor electrode;

determining a real part and an imaginary part of the voltage by combining the voltage measured at the sensor electrode with a first and a second AC voltage which are mutually phase-shifted by a quarter period in order to determine the capacitance of the measuring capacitor from the real part and the imaginary part of the voltage; and determining the distance between the sensor electrode and the workpiece from the capacitance of the measuring capacitor.

2. The method according to claim 1, wherein a signal corresponding to at least a resistance of a plasma between the sensor electrode and the workpiece is determined from the real and imaginary parts of the measuring voltage.

3. The method according to claim 2, wherein said step of combining the voltage measured at the sensor electrode with the first and the second AC voltage includes multiplying the measuring voltage by the first AC voltage and the second AC voltage, respectively.

4. The method according to claim 1, wherein said step of determining a real part and an imaginary part includes subjecting the measuring voltage to a first and a second synchronous rectification, respectively.

5. The method according to claim 4, wherein the first synchronous rectification uses the first AC voltage and the second synchronous rectification uses the second AC voltage phase-shifted by a quarter period with respect thereto.

6. The method according to claim 3, wherein the real part and the imaginary part obtained by said step of multiplying are freed from AC voltage components by low-pass filtering, in order to obtain first and second voltage signals, respectively, corresponding to the real and imaginary parts of the measuring voltage.

7. The method according to claim 6, wherein said step of determining the capacitance of the measuring capacitor includes calculating a voltage divider formed by a reference resistor and the measuring capacitor.

8. The method according to claim 6, further comprising the step of:

determining a plasma impedance of the measuring capacitor by using the first and second voltage signals, respectively, and by calculating a voltage divider formed by a reference resistor and the measuring capacitor.

9. The method according to claim 1, wherein a measuring line, used in measuring the measuring voltage at the sensor electrode, is actively screened.

10. The method according to claim 9, wherein the measuring voltage, obtained via the measuring line, is applied to the screen of the measuring line via an impedance transformer.

* * * * *